United States Patent [19]

Kigoshi

[11] Patent Number: 5,052,245

[45] Date of Patent: Oct. 1, 1991

[54] TRANSFER CASE FOR A FOUR WHEEL DRIVE VEHICLE WITH AUTOMATIC TRANSMISSION

[75] Inventor: Kaoru Kigoshi, Kanagawa, Japan

[73] Assignee: Isuzu Motors Limited, Tokyo, Japan

[21] Appl. No.: 454,247

[22] Filed: Dec. 21, 1989

[30] Foreign Application Priority Data

Dec. 29, 1988 [JP] Japan ................................ 63-335356

[51] Int. Cl.$^5$ ......................... B60K 17/34; F16H 3/38
[52] U.S. Cl. .................................. 74/665 T; 180/247;
74/335; 74/483 R; 192/363; 340/456
[58] Field of Search ................. 74/4 TI, 483 R, 339,
74/66 ST, 475, 527, 335; 180/233, 247;
340/456; 192/3.63

[56] References Cited

U.S. PATENT DOCUMENTS

| | | | |
|---|---|---|---|
| 2,532,945 | 12/1950 | Robinson | 74/335 |
| 3,319,479 | 5/1967 | Iavelli et al. | 74/335 |
| 3,795,153 | 3/1974 | Seilly | 74/477 X |
| 4,356,879 | 11/1982 | Uchiyama | 180/247 |
| 4,508,190 | 4/1985 | Uchiyama | 180/247 |
| 4,651,848 | 3/1987 | Kobayashi et al. | 74/477 X |
| 4,702,127 | 10/1987 | Cote | 74/335 X |
| 4,714,128 | 12/1987 | Yoshinaka et al. | 74/475 X |
| 4,782,721 | 11/1988 | Dick | 180/247 X |
| 4,805,718 | 2/1989 | Iwata et al. | 180/247 X |
| 4,823,631 | 4/1989 | Kishimoto | 74/339 |
| 4,854,413 | 8/1989 | Kameda et al. | 180/247 |
| 4,888,577 | 12/1989 | Dunkley et al. | 340/456 X |

FOREIGN PATENT DOCUMENTS

| | | |
|---|---|---|
| 56-23701 | 6/1981 | Japan . |
| 189860 | 11/1986 | Japan . |
| 196827 | 12/1986 | Japan . |
| 2079388 | 1/1982 | United Kingdom . |
| 2088608 | 6/1982 | United Kingdom . |
| 2109879 | 8/1983 | United Kingdom . |

*Primary Examiner*—Allan D. Hermann
*Assistant Examiner*—Khoi Q. Ta
*Attorney, Agent, or Firm*—Browdy and Neimark

[57] ABSTRACT

The operation device of a transmission in accordance with the present invention has a lock mechanism which can lock a shift rod in either a high speed range or a low speed range in a transfer in response to a detection signal when a control lever is positioned at a parking range, and has also alarm means for raising an alarm in response to a detection signal when the transfer is at a neutral position. When a vehicle is parked with the control lever being in the parking range, a driver can recognize the state of the transfer by the alarm if the transfer is at the neutral position, and shifts the shift rod to the high or low speed range by operating the transfer lever. The lock mechanism operates in the high or low speed range and a full driving system is connected so that the vehicle can be kept stopped and self-run of the vehicle on a slope or the like can be prevented.

14 Claims, 7 Drawing Sheets

4-WHEEL DRIVE, HIGH SPEED RANGE

2-WHEEL DRIVE, HIGH SPEED RANGE

4-WHEEL DRIVE, LOW SPEED RANGE

TRANSFER CASE FOR A FOUR WHEEL DRIVE VEHICLE WITH AUTOMATIC TRANSMISSION

BACKGROUND OF THE INVENTION

1. Field of the Invention

This invention relates to an operation device of a transmission comprising the combination of a manual multi-range transfer and an automatic transmission.

2. Description of the Prior Art

In four-wheel drive vehicles, there is known conventionally a driving system which comprises the combination of an automatic transmission and a manual multi-range transfer. In the driving systems, a driving system having a structure wherein the manual multi-range transfer has structurally a neutral state is also known. Some manual multi-range transfer devices are equipped with a two-range switching device for switching to either a high speed range and a low speed range. In the manual multi-range transfers in general in part-time four-wheel drive vehicles, a switching operation of the driving system to the high speed range and the low speed range and a switching operation of the driving system to two-wheel drive and four-wheel drive are effected by one transfer lever. Moreover, the switching operation between two-wheel drive and four-wheel drive can be effected only at the time of the high speed range. An example of an operation device of such a transmission is an interlock mechanism of a transmission disclosed in Japanese Utility Model Publication No. 23701/1981.

The manual multi-range transfer of the driving system of the part-time four-wheel drive vehicles will be described with reference to FIG. 1. In this manual multi-range transfer, an output shaft 2 is a driving system which transmits driving force to rear wheels while an output shaft 15 is a driving system which transmits the driving force to front wheels. This manual multi-range transfer comprises an input shaft 1 to which the driving force of an engine is transmitted through a clutch or the like, an output shaft 2 for the rear wheels which is disposed on the axis of the input shaft 1, a synchronizing device 5 as a connecting device which is interposed between the input shaft 1 and the output shaft 2, and a counter shaft 3 which is disposed in parallel with the input shaft 1 and the output shaft 2. The counter shaft 3 is equipped with a gear 7 as a first gear which always meshes with an input gear 6 fitted rotatably to the input shaft 1 and a gear 9 as a second gear which always meshes with a gear 8 fixedly disposed on the output shaft 2. Furthermore, the input shaft 1 is fixed integrally to a clutch hub 16 constituting the synchronizing device 5. If the transfer is constructed as described above, it can be switched to the high speed range where the input shaft 1 is directly coupled to the output shaft 2 or to the low speed range where it is coupled to the latter through the counter shaft 3. In other words, when a driver operates a transfer lever (not shown, refer to reference numeral 28 in FIG. 4) and moves the sleeve 4 of the synchronizing devices to the right in the drawing, the sleeve 4 meshes with a dog gear 11 which is spline-fitted to the gear 8 through a synchronizing ring (not shown, refer to reference numeral 31 in FIG. 5). Accordingly, the power transmission system becomes the input shaft 1→the clutch hub 16→the sleeve 4→the dog gear 11→the gear 8→the output shaft 2, and the high speed range where the input shaft 1 is coupled directly to the output shaft 2 can be obtained. When the driver operates the transfer lever and moves the sleeve 4 in the synchronizing device 5 to the left in the drawing, the sleeve 4 meshes with a dog gear 10 spline-fitted to the input gear 6 through the synchronizing ring (not shown, refer to reference numeral 48 in FIG. 5). Accordingly, the power transmission system becomes the input shaft 1→the clutch hub 16→the sleeve 4→the dog gear 10→the input gear 6→the gear 7→the counter shaft 3→the gear 9→the gear 8→the output shaft 2, and the low speed range where the input shaft 1 is coupled to the output shaft 2 through the counter shaft 3 can be obtained.

This manual multi-range transfer provides a driving system for four-wheel drive vehicles of a part-time four-wheel drive type wherein the driving force is transmitted to the front wheels and to the rear wheels, or a driving system for two-wheel drive vehicles wherein the driving force is transmitted only to the rear wheels. First of all, as to the driving system of the front wheels, a gear 12 meshing with the gear 9 is rotatably fitted to the output shaft 15. A clutch hub 17 is fixedly fitted to the output shaft 15. In this transfer the driver slides and moves the sleeve 14 meshing always with the clutch hub 17 to the right in the axial direction in the drawing by use of the transfer lever. When the driving system is set to the driving system of the two-wheel drive vehicles, the driver slides the sleeve 4 to the high speed range side by the transfer lever in accordance with the shift pattern shown in FIG. 1(A) and after attaining the high speed range of the four-wheel drive vehicles, he slides the sleeve 14 meshing always with the clutch hub 17 to the left in the axial direction in the drawing by the transfer lever. In other words, one transfer lever moves along the orbit of arrow CR in FIG. 1(A). The driving system of the two-wheel drive vehicles can be shifted from the high speed range of the four-wheel drive vehicles by this transfer lever but cannot from the low speed range of the four-wheel drive vehicles. Therefore, the driving system is always coupled to the high speed range when the switching operation is made between four-wheel drive and two-wheel drive. However, a neutral state occurs in the driving system at the time of shift between the high speed range and the low speed range of four-wheel drive.

To obtain the driving system of the four-wheel drive vehicles, therefore, the driver slides and moves the sleeve 14 to the right in the axial direction by the transfer lever so that the sleeve 14 meshes with the dog gear 13 disposed on the gear 12. When the sleeve 12 meshes with the dog gear 13, and the output shaft 15 rotates integrally with the gear 12. Accordingly, the driving force from the input shaft 1 is transmitted to the gear 8 through the driving system of the high speed range and then to the front wheels through the gear 8→the gear 9→the gear 12→the dog gear 13→the sleeve 14→the clutch hub 17→the output shaft 15.

Japanese Utility Model Laid-Open No. 189860/1986 discloses an alarm device of a part-time four-wheel drive vehicle. The alarm device disclosed in this reference includes a four-wheel drive switch for detecting four-wheel drive, a car speed switch for detecting a low speed and a winker switch for detecting the operation of winkers and when three conditions by the operation of these three switches are established, an alarm is raised. The alarm device of a part-time four-wheel vehicle cannot prevent self-run of the vehicle when it is stopped or parked on a slope, or the like.

Japanese Utility Model Laid-Open No. 196827/1986 discloses a shift device of a four-wheel drive transfer. This shift device is a shift device of a four-wheel drive transfer which sequentially shifts two-wheel drive, four-wheel high speed, four-wheel neutral and four-wheel low speed in accordance with the shift operation of the transfer lever and which includes a stopper pin for anchoring a fork rod for selecting high speed, neutral and low speed in the four-wheel drive state in front and at the back of the neutral position, an actuator for coming in and out the stopper pin, and a stopper release switch disposed on the transfer lever and retracting the stopper pin by the operation of the actuator due to the release operation to release the engagement of the fork rod. This shift device discloses the lock mechanism for all the operation mechanisms of the transfer but does not disclose the technical concept that self-run of the vehicle at the stop on the slope or the like is prevented by locking the shift rod in response to the position relation with the control lever of the automatic transmission, that is, the position detection of the control lever.

As the function peculiar to the automatic transmission, however, the mechanical lock mechanism of the driving system in the parking range can be mentioned as a problem. In the actual operation by the driver, the brake is not used conjointly at the stop or parking of the vehicle but the vehicle is mostly stopped or parked by the function of the parking range alone. However, the stop or parking of the vehicle in this parking range can be established only when the driving systems are fully connected. In the operation device of a transmission comprising the combination of the automatic transmission described above with the manual multi-range transfer in the four-wheel drive vehicle, even if the control lever of the automatic transmission is in the lock state in the parking range, for example, the driving system after the sleeve 4 or the input shaft 1 or in other words, the driving systems after the dog gears 10, 11 et seq are not connected to the driving system of the engine and are not restricted if the manual multi-range transfer is in the neutral state, that is, unless the sleever 4 is engaged with the dog gear 10 or 11. Accordingly, the vehicle cannot be kept stopped on the slope or the like. Even when the manual multi-range transfer is at any suitable connecting position, that is, when the sleeve 4 meshes with the dog gear 11 to select the high speed range or when the sleeve 4 meshes with the dog gear 11 to select the low speed range and the vehicle is at halt, there is the risk that the vehicle runs by itself when it is at halt on the slope or the like, if the synchronizing device is moved to the neutral position as the manual multi-range transfer is accidentally operated by mischief of a child, or the like. In this case, the transfer lever of the operation device of the transmission is only one and the switching operation of the driving system between four-wheel drive and two-wheel drive cannot be made unless the transmission is set to the high speed range of four-wheel drive. Accordingly, the driving systems are fully connected between four-wheel drive and two-wheel drive and the neutral position does not exist in the driving systems.

Accordingly, there remains the problem how the operation device of the transmission should be constructed in order to obtain the construction wherein the transfer lever cannot operate when the automatic transmission is selected and set to the parking range and the vehicle is in the stop or parking state and the driving system is kept in the high speed range or low speed range without causing the shift of the manual multi-range transfer to the neutral position.

SUMMARY OF THE INVENTION

It is therefore an object of the present invention to provide an operation device of a transmission which solves the problems described above, which incorporates a lock mechanism as mechanical or electric lock means in a shift control system of a manual multi-range transfer or a lock mechanism for restricting the shift control system of the manual multi-range transfer so that the driving system comprising the combination with the automatic transmission is always in the connected state in the parking range and the shift control system keeps the state where it is connected to the driving system of the high speed range or the low speed range, which can thus keep reliably the vehicle in the stop or parking state even when it is stopped or parked while the control lever of the automatic transmission is selected and set to the parking range, and which has high safety.

It is another object of the present invention to provide an operation device of a transmission which includes a lock mechanism for locking a shift rod operated by a transfer lever as first switching means to either a high speed range or a low speed range in a transfer in response to a detection signal that a control lever of an automatic transmission as second switching means is in the parking range, and alarm means for raising an alarm in response to a detection signal that the transfer is at a neutral position, and wherein when a driver sets the control lever to the parking range, the shift rod can be set into a lock state of either of the speed ranges, the driving system from an engine can be kept in the state where it is connected to driving wheels, when the transfer is at the neutral position, the driver can recognize this state by the alarm and he can thus shift the shift rod to either of the speed ranges to keep of the shift rod in the lock state.

It is still another object of the present invention to provide an operation device of a transmission which includes a range detection mechanism for detecting the shift range position of a control lever, an engine driving detection mechanism for detecting the driving state of the engine and a neutral position detection switch for detecting the neutral position of the manual multi-range transfer, and wherein the lock mechanism effects the lock operation in response to the signal from each of these detection means so that the control lever is shifted to the parking range, the driving system is set to the four-wheel drive system and moreover, the lock mechanism can be reliably locked by detecting that the transmission is at the neutral position.

It is still another object of the present invention to provide an operation device of a transmission wherein the alarm means raises an alarm in response to the neutral position detection signal of the neutral position detection switch disposed on the manual multi-range transfer and to the connection state detection signal of the four-wheel drive system from the driving system detection switch so that the driver can essentially recognize the neutral state of the transfer when the driving system is set to the four-wheel drive side and the shift rod is at the neutral position.

It is still another object of the present invention to provide an operation device of a transmission wherein the lock mechanism consists of a lock pin meshing with a notch formed on the shift rod, a spring or solenoid for engaging the lock pin with the notch and a solenoid operating to release the engagement of the lock pin, and the load of the lock pin is received in a direction orthogonal to the axis of a stepped pin sliding by the energization of the solenoid, the load acting on the lock pin does not act in the operation direction of the solenoid and hence, the solenoid itself can be made compact.

It is still another object of the present invention to provide an operation device of a transmission wherein, when the driver sets the control lever as the second switching means to the parking range, the shift rod can be locked to either of the speed ranges so that the driving system from the engine can be fully connected to the driving wheels; when the transfer is at the neutral position, the driver can recognize the state by the alarm and shifts the shift rod to either of the speed range by operating the transfer lever as the first switching means and can lock the shift rod so that the vehicle does not run by itself on the slope or the like when it is kept stopped in the parking range; and the operation device thus has high safety.

It is still another object of the present invention to provide an operation device of a transmission wherein, even when the lock mechanism is broken, for example, and the lock mechanism cannot therefore be released, the vehicle itself can be connected to the high or low speed range of the driving system four-wheel drive or two-wheel drive and can run and eliminate any problems with running of the vehicle itself; and when the lock mechanism is set to the shift rod of the manual multi-range transfer, installation is easy, the space may be small and the number of components hardly increases.

It is a further object of the present invention to provide an operation device of a transmission wherein a switch hole such as an existing detect ball hole can be as such used as the hole for lock as well as for switch if a construction is employed so that the lock mechanism has a detection switch mechanism.

DETAILED DESCRIPTION OF THE EMBODIMENT

Hereinafter, an embodiment of an operation device of a transmission in accordance with the present invention will be described with reference to the accompanying drawings. In the description which follows, like reference numerals are used to identify like constituents, inclusive of those shown in FIG. 1, having the same function, and repetition of the explanation of such constituents will be omitted.

Figure 1:
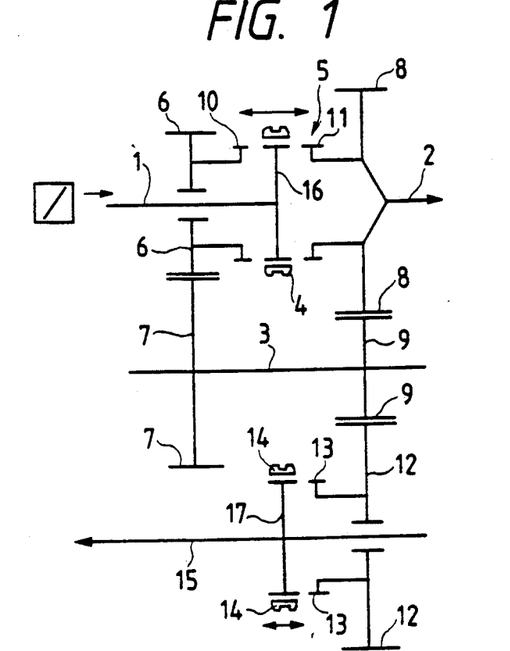
FIG. 1 is a schematic diagram showing an example of a manual multi-range transfer in which an operation device of a transmission in accordance with the present invention can be assembled.
Figure 1A:
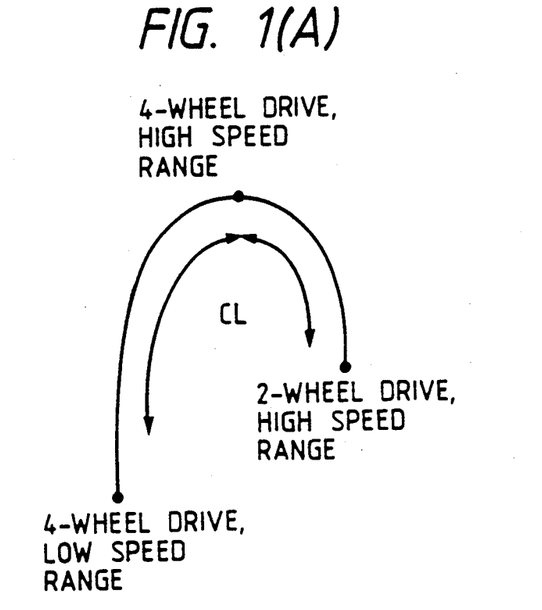
FIG. 1(A) is an explanatory view showing the shift patterns of the manual multi-range transfer shown in FIG. 1.

The operation device of a transmission in accordance with the present invention can be applied, for example, to the combination of the manual multi-range transfer shown in FIG. 1 and an automatic transmission. This manual multi-range transfer is a manual switch type transfer which is manually switched to a low or high speed range in four-wheel driving by a transfer lever as first switching means and is switched to a driving system in two-wheel drive or four-wheel drive by the same transfer lever when set to the high speed range. Mechanically, it has a neutral position in the driving system at the time of switching between the low speed range and high speed range. Since the construction and operation of the manual multi-range transfer has already been explained with reference to FIGS. 1 and 1(A), the explanation will be hereby omitted.

Figure 2:
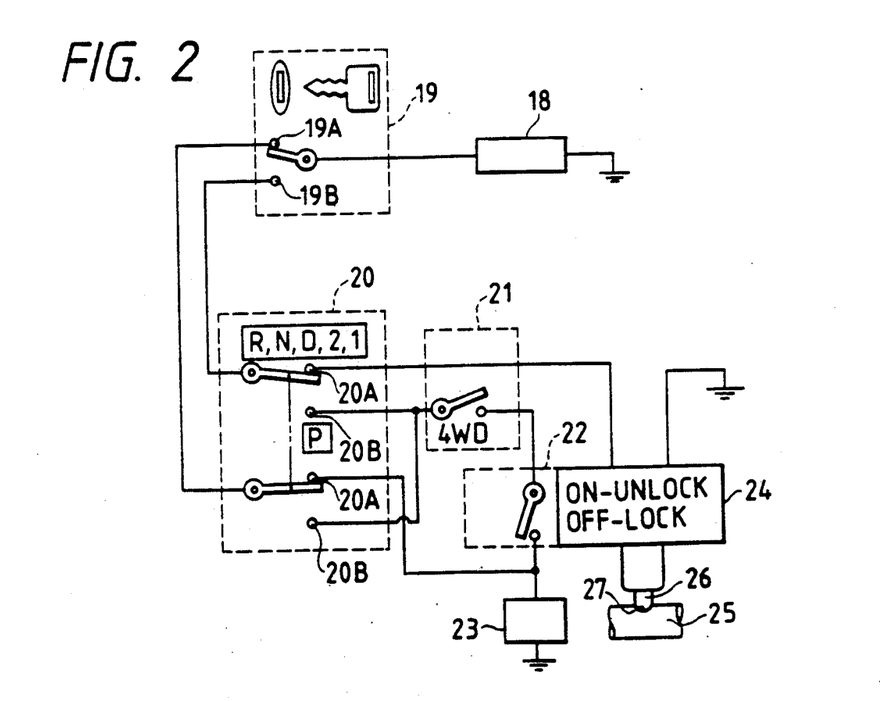
FIG. 2 is a circuit diagram showing an example of the operation of the operation device of a transmission in accordance with the present invention.

FIG. 2 shows a circuit diagram of a lock mechanism as lock means which is applied to the operation device of a transmission in accordance with the present invention. The operation device of the transmission in accordance with the present invention has primarily the following functions.

I. A range detection mechanism 20 as range detection means for detecting at which positions of parking range, i.e. P range, a reverse range, i.e. R range, a neutral range, i.e. N range, an automatic transmission range, i.e. D range, a second range, i.e. 2nd range and a first range, i.e. 1st range, a control lever in an automatic transmission is positioned, or for detecting whether or not it is positioned at the parking range P;

II. An engine driving detection mechanism 19 for detecting ON/OFF of an engine or whether or not the engine is operative by an ignition key;

III. A lock mechanism 24 as lock means for locking or unlocking the sliding movement of the shift rod 25 in a manual multi-range transfer. As will be described later, this lock mechanism 24 is unlocked when, for example, a solenoid is energized by receiving an electric signal in an electric circuit and is locked by the force of a spring or by the operation of another solenoid when a power source is turned off while the shift rod 25 is at the normal position of the transmission range.

IV. A switch for detecting at which positions of a high speed range, a low speed range and a neutral range a transfer lever is positioned in the manual multi-range transfer or in other words, a neutral position detection switch 22 as neutral position detection means for detecting the neutral position under the state where a sleeve 4 is not engaged with a dog gear 10 or 11. This neutral position detection switch 22 is set so that it is turned ON when the transfer lever is at the neutral position. The neutral position detection switch 22 is turned OFF when, for example, a lock pin 26 disposed on the shift rod 25 meshes with a notch 27 formed on the shift rod 25 and is turned ON when they do not mesh with each other.

V. A driving system detection switch 21 as driving system detection means for detecting to which of the driving systems, that is, two-wheel drive and four-wheel drive, the transfer lever in the manual multi-range transfer is connected. This driving system detection switch 21 is set so that it is turned ON when the transfer lever of the manual multi-range transfer is positioned at the driving system of four-wheel drive.

VI. Alarm means 23 which operates by the combination of the neutral position detection switch 22 and the driving system detection switch 21. This alarm means 23 consists of a buzzer, for example, and does not operate unless the automatic transmission is positioned at least at the parking range P.

Figure 3:
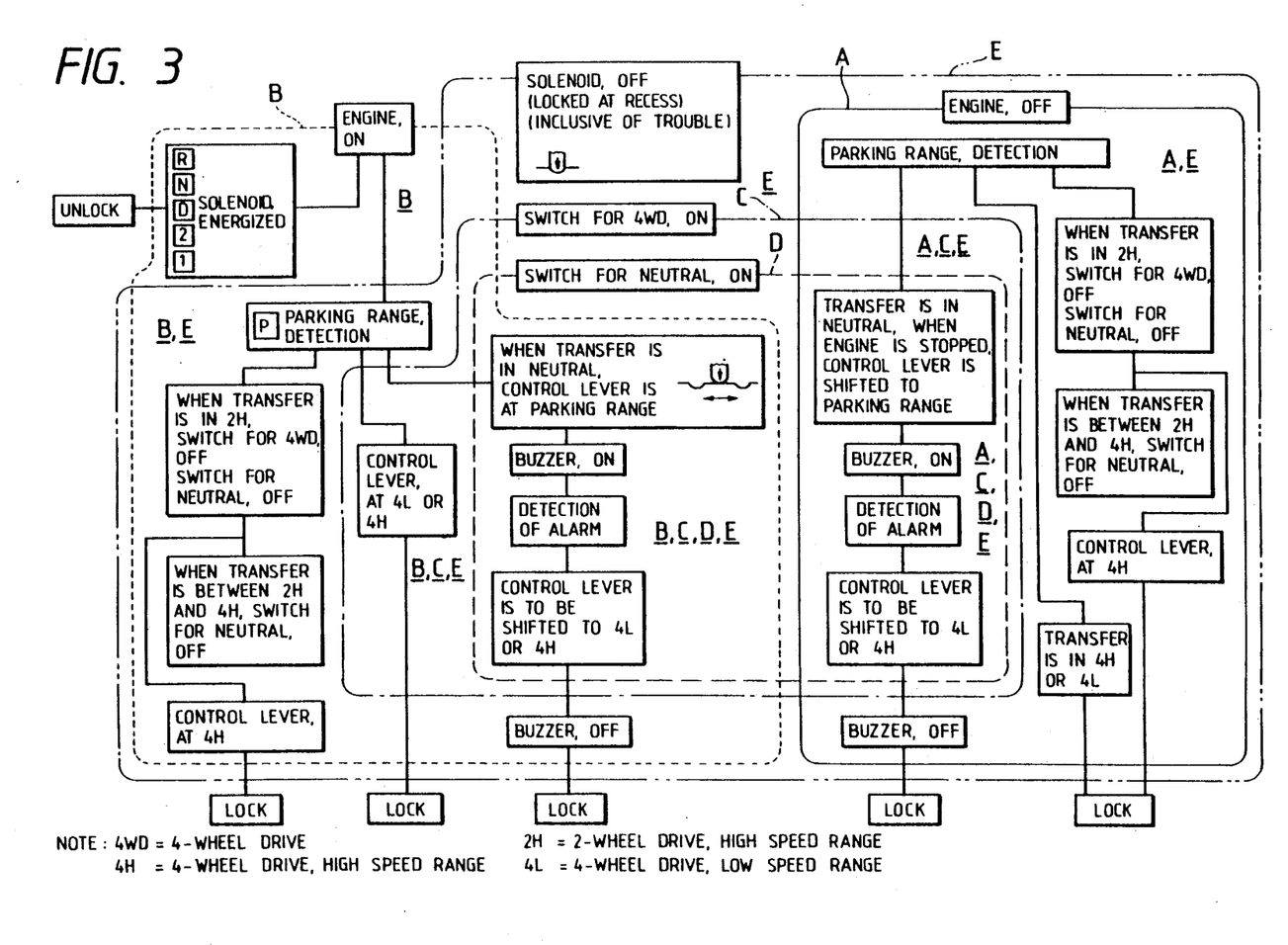
FIG. 3 is an explanatory view showing operation ranges of the operation device of a transmission in accordance with the present invention.

The operation of the lock mechanism 24 assembled in the operation device of the transmission in accordance with the present invention will be explained with reference to FIGS. 2 and 3. FIG. 3 is an explanatory view showing the ranges of the operation state of the operation device of the transmission of the present invention in accordance with groups.

[I] Re: When the engine driving detection mechanism 19 detects that the engine is at the OFF contact 19A (ranges A and E in FIG. 3):

Under this state a current is not supplied from a power source 18 to the lock mechanism 24, which is kept under the lock state by a spring, for example (ranges A and E in FIG. 3).

First of all, when the range detection mechanism 20 detects the contact 20A on the side of the N range, the D range, the 2nd range and the 1st range, the alarm means 23 is turned ON and raises an alarm. Therefore, the driver can know that the speed range is not the P range, and changes the control lever to the P range. When the control lever is set to the P range, the output shaft of the driving system is locked mechanically so that the vehicle does not move by itself even on a slope or the like and can be reliably kept in the parking or stop state.

Next, when the range detection mechanism 20 detects the contact 20B on the P range side and the driving system detection switch 21 detects two-wheel drive, the alarm means 23 is turned off. In other words, when the manual multi-range transfer is in the two-wheel drive driving system, the four-wheel drive switch is OFF and the transfer lever of the manual multi-range transfer is always set to the high speed range of the four-wheel drive so that the driving system is always connected fully from the engine to the wheels, no current flows through the circuit of the neutral position detection switch 22 for detecting the neutral position and this circuit is always OFF. In other words, in the switching operation between the two-wheel drive and four-wheel drive, the neutral state does not exist in the driving system. Accordingly, the lock mechanism 24 need not be operated (the ranges A and E in FIG. 3).

When the range detection mechanism 20 detects the contact 20B on the P range side and the driving system detection switch 21 is ON to detect four-wheel drive and furthermore, when the lock pin 26 of the lock mechanism 24 is engaged with the notch 27 of the shift rod 25, the neutral position detection switch 22 is OFF so that the alarm means 23 is OFF (the ranges A, C and E in FIG. 3).

When the range detection mechanism 20 detects the contact 20B on the P range side, the driving system detection switch 21 detects four-wheel driving and the lock pin 26 of the lock mechanism 24 is not engaged with the notch 27 of the shift rod 25, then the neutral position detection switch 22 is ON and the alarm means 23 is ON and raises an alarm. Therefore, since the driver can know from the alarm means 23 such as a buzzer that the driving system is not in the lock state but is in the neutral state, he switches the range to the high speed range or the low speed range of four-wheel drive by operating the transfer lever. Accordingly, the alarm of the alarm means 23 is turned oFF, the shift rod 25 is locked by the lock mechanism 24 and the vehicle may be parked or stopped in the parking range (the ranges A, C, D and E in FIG. 3).

[2] Re: When the engine is detected as being at the ON contact 19B by the engine driving detection mechanism 19 (the range B in FIG. 3):

When the range detection mechanism 20 detects the contact 20A on the side of the R range, the N range, the D range, the 2nd range and the 1st range, the current is supplied from the power source 18 by the lock mechanism 24 to turn it ON and this mechanism is kept in the unlock state by a spring, for example. Needless to say, the alarm means 23 is OFF (the range B in FIG. 3).

When the range detection mechanism 20 detects the contact 20B on the P range side and the driving system detection switch 21 detects two-wheel drive, the alarm means 23 is turned OFF. Since the supply of the current from the power source 18 to the lock mechanism 24 is cut off at this time, the lock mechanism 24 is in the lock state. In other words, when the manual multi-range transfer is in the driving system of two-wheel drive, the four-wheel drive switch is OFF and is not positioned at the neutral position. Furthermore, the current does not flow through the circuit of the neutral position detection switch 22 for detecting the neutral position and this circuit is always OFF. Accordingly, the neutral state does not exist in the driving system in the switching operation between two-wheel drive and four-wheel drive as described above, and hence the lock mechanism 24 need not be operated (the ranges B and E in FIG. 3).

When the range detection mechanism 20 detects the contact 20B on the P range side, the driving system detection switch 21 detects four-wheel drive and furthermore, when the lock pin 26 of the lock mechanism 24 is engaged with the notch 27 of the shift rod 25, then the neutral position detection switch 22 is OFF and the alarm means 23 is OFF, too (the ranges B, C and E in FIG. 3).

When the range detection mechanism 20 detects the contact 20B on the P range side and the driving system detection switch 21 detects four-wheel drive but the lock pin 26 of the lock mechanism 24 is not engaged with the notch 27 of the shift rod 25, then the neutral position detection switch 22 is turned ON and the alarm means 23 is also turned ON and raises an alarm. Therefore, since the driver can know by the alarm of the alarm means 23 such as a buzzer that the shift rod 25 is not in the lock state and the driving system is in the neutral state, he switches the range to either the high speed range or the low speed range of four-wheel drive.

Accordingly, the alarm of the alarm means 23 is turned OFF, the shift rod 25 is locked by the lock mechanism 24 and the vehicle may be parked or stopped in the parking range (the ranges B, C, D and E in FIG. 3).

Figure 4:
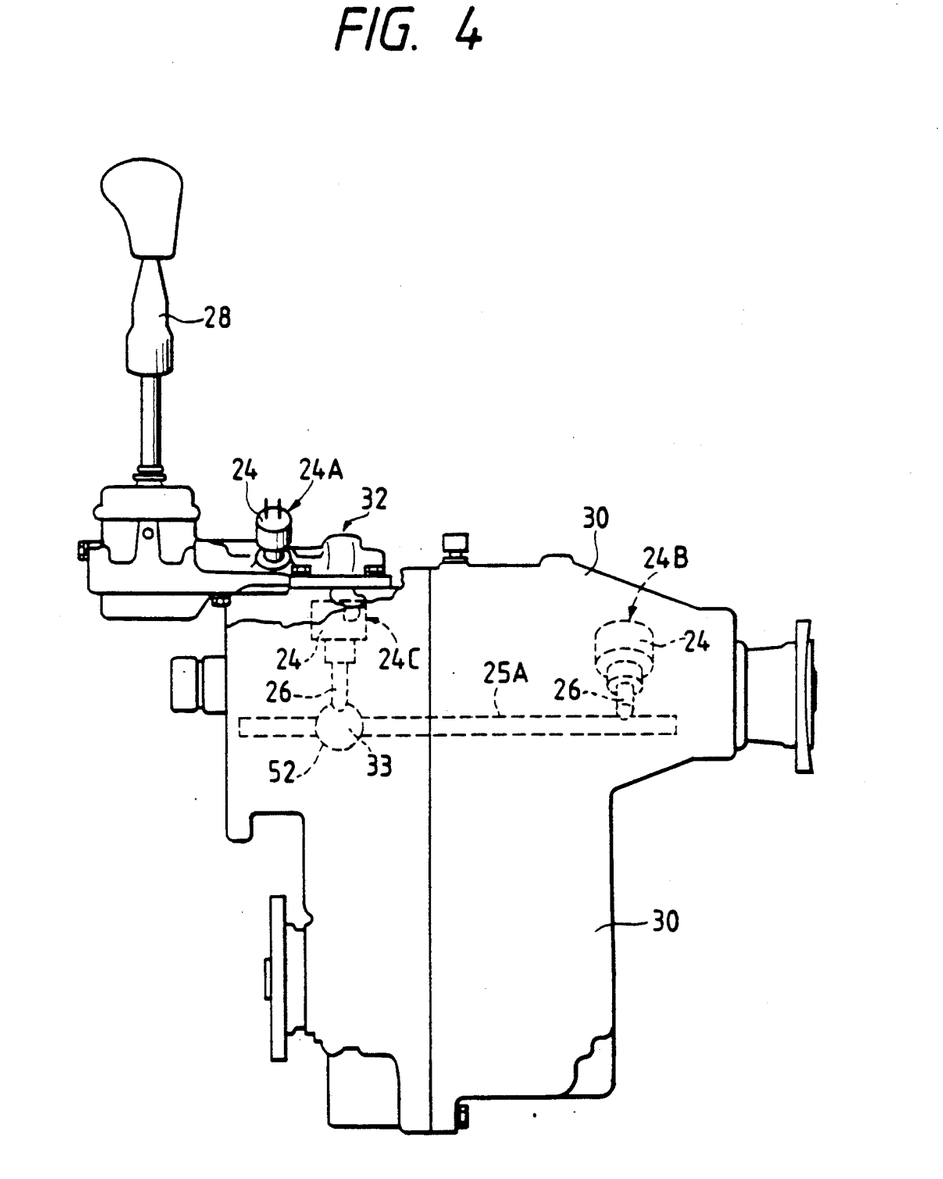
FIG. 4 is a schematic view showing various examples of fitting positions of a lock mechanism.

Next, examples of the position of disposition of the lock mechanism assembled in the operation device of the transmission in accordance with the present invention will be described with reference to FIG. 4. This lock mechanism 24 is an electric lock mechanism that can be fitted to the case 30 of the existing manual multi-range transfer, that is, a solenoid type lock mechanism. In FIG. 4, there are shown three examples of the positions of disposition of the lock mechanism 24 assembled in the operation device of the transmission in accordance with the present invention.

First of all, in the first example of the position of disposition, the lock mechanism 24 is disposed in the control box 32 of the shift rod 25 (see FIG. 5) of the transmission between the high speed range and the low speed range in four-wheel drive which is fitted to the case 30 of the manual multi-range transfer as represented by reference numeral 24A. The transfer lever 28 for sliding and moving the shift rod 25 is disposed in this control box 32. In another example of the position of disposition, the lock mechanism 24 is fitted to the rod 25A which is in turn fitted into the case 30 of the manual multi-range transfer, as represented by reference numeral 24B. It is disposed outside and opposite to the transfer case 30 and on the extension of the rod 25A. In still another example, the lock pin 26 of the lock mechanism 24 is fitted to the detent ball hole 33 formed on the rod 25A inside the tranfer main body disposed below the switch hole of the four-wheel drive switch 52 (see FIG. 8). When the lock mechanism 24 is disposed at each position of the manual multi-range transfer as described above, disposition becomes easy, the space may be small and the increase in the number of components is hardly increased. Moreover, since the lock mechanism 24 is constituted in such a manner as to include the detection switch mechanism, the screw hole for the switch such as the existing detent ball hole 33 or the like can as such be used as the hole for the lock as well as for the switch.

Figure 5:
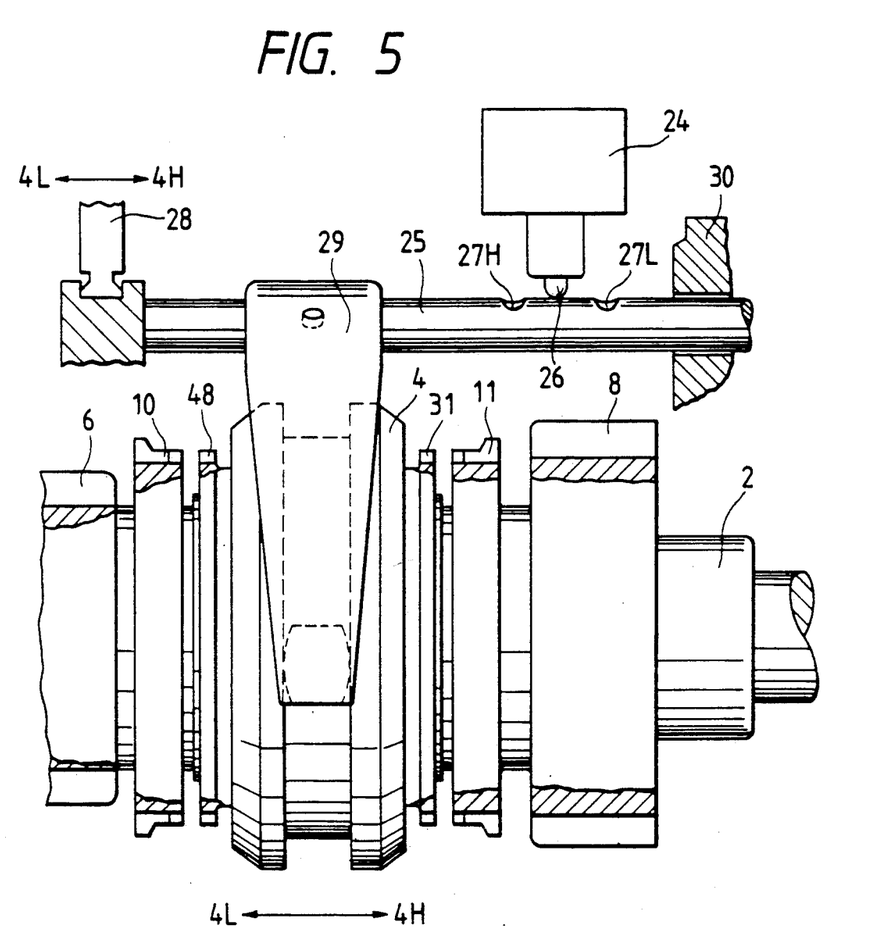
FIG. 5 is a schematic view showing an example of the operation device of a transmission in accordance with the present invention.

An example of the lock mechanism assembled in the operation device of the transmission in accordance with the present invention will be explained with reference to FIG. 5. The position of disposition of the lock mechanism 24 shown in FIG. 5 is similar to the one that is disposed on the control box 32 fitted to the case 30 of the manual multi-range transfer shown in FIG. 4. Notches 27H, 27L with which the lock pin 26 of the lock mechanism 24 is engaged are formed on the shift rod 25. Since the lock mechanism 24 has the construction such as described above, when the driver shifts the transfer lever 28 to the right in the drawing or towards arrow 4H in the drawing in order to switch the transfer lever 28 to the high speed side, the shift fork 29 fixed to the shift rod 25 moves to the right in the drawing and the sleeve 4 meshing with the shift fork 29 meshes with the dog gear 11 through the synchronizing ring 31 and is switched to the high speed range. At the same time, the lock pin 26 of the lock mechanism 24 moves to the position where it can engage with the notch 27H of the shift rod 25 in the lock state. In contrast, when the driver shifts the transfer lever 28 to the left in the drawing or towards the arrow 4L in order to switch the transfer lever 28 to the low speed range, the sleeve 4 fitted to the shift fork 29 meshes with the dog gear 10 of the gear 6 through the synchronizing ring 48, the shift lever 28 is switched to the low speed range and at the same time, the lock pin 26 of the lock mechanism 24 moves to the position where it can mesh with the notch 27L formed on the shift rod 25.

Figure 6:
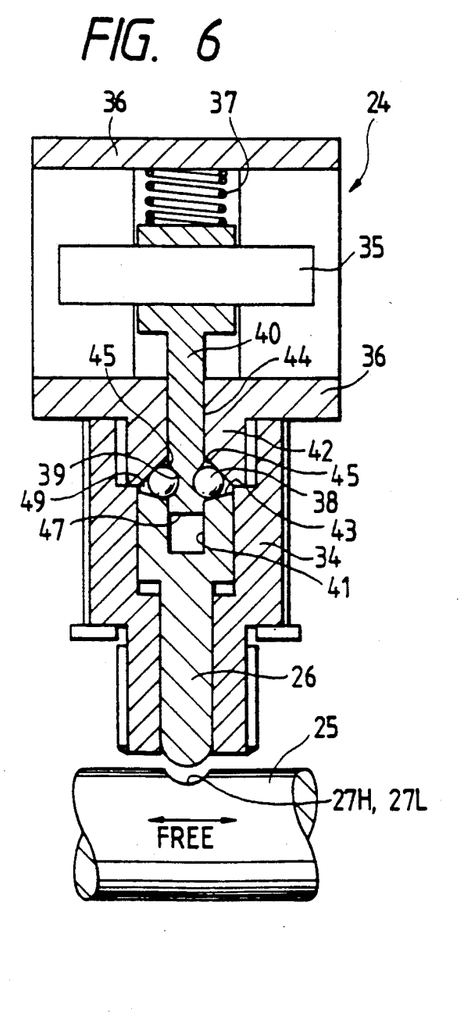
FIG. 6 is a sectional view showing the free state of the lock mechanism.
Figure 7:
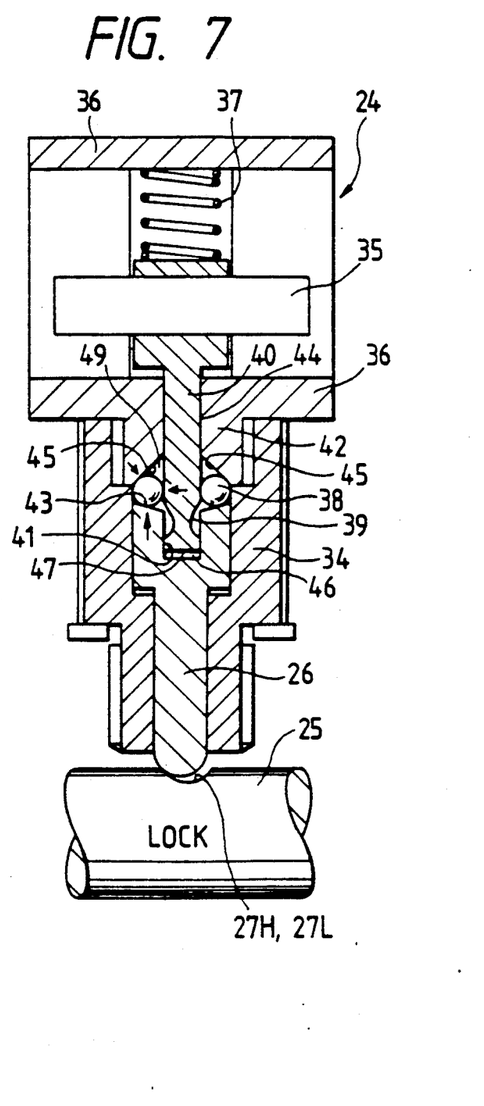
FIG. 7 is a sectional view showing the lock state of the lock mechanism.

Furthermore, an example of the structure of the lock mechanism will be explained further with reference to FIGS. 6 and 7. FIG. 6 is a sectional view showing the non-engagement state of the lock mechanism 24 and FIG. 7 is a sectional view showing its engagement state. This lock mechanism 24 is constructed in such a manner as to be made operative or non-operative in accordance with a solenoid switch, that is, the solenoid 35. In this lock mechanism 24, the sub-case 36 is fixed to the main case 34, the lock pin 26 is fitted to the main case 34 in such a manner as to be capable of reciprocating and a stepped pin 40 operated by the solenoid 35 is fitted to the sub-case 36 in such a manner as to be capable of reciprocating. The lower end of the lock pin 26 can mesh with the notches 27H, 27L formed on the shift rod 25 and its upper end is equipped with a fitting hole 41 which the tip of the stepped pin 40 can come into and out. The solenoid 35 and the spring 37 are disposed. A ball 38 capable of meshing with the recess 39 formed in the stepped pin 40 is disposed between the upper end surface 43 of the lock pin 26 inside the main case 34 and the lower end surface 45 of the projection 42 of the sub-case 36.

When a current is passed through the solenoid 35 in the lock mechanism 24 and this solenoid 35 is energized, the stepped pin 40 moves upward against the force of the spring 37 as shown in FIG. 6. When the stepped pin 40 moves upward, the ball 38 is anchored to the recess 39 of the stepped pin 40 and moves towards the center. As the ball 38 moves towards the center, the lock pin 26 can not move up and down and if the moving force is applied to the shift rod 25 by the transfer lever 28, the lock pin 26 is pushed up and the shift rod 25 can slide in the axial direction.

In the lock mechanism 24, when the current to the solenoid 35 is cut off, the stepped pin 40 is pushed down by the force of the spring 37. If the lock pin 26 is at the position where it can be anchored to the notches 27H, 27L of the shift rod 25 at this time, the ball 38 moves outwardly in the radial direction along the inclined surface of the recess 39 of the stepped pin 40. Then, the lock pin 26 is anchored to the notches 27H, 27L of the shift rod 25, the stepped pin 40 moves further downward and the ball 38 is stored in the space 49 defined by the parallel portion 44 of the stepped pin 40, the upper end surface 43 of the lock pin 26 and the lower end surface 45 of the projection 42 of the sub-case 36. At this time, since the ball 38 is firmly fixed as described above, the shift rod 25 cannot at all move even if it attempts to slide and move and consequently, the shift rod 25 is kept in the lock state by the lock pin 26. At this time a gap 46 exists between the bottom surface of the fitting hole 41 of the lock pin 26 and the lower end surface 47 of the stepped pin 40 and moreover, the load from the shift rod 25 acts in the axial direction of the lock pin 25 and in the direction orthogonal to the axis with respect to the stepped pin 40. In other words, the load acts only on the sub-case 36 through the ball 38 but does not act on the solenoid 35. Accordingly, a compact solenoid 35 can be used sufficiently.

When the current to the solenoid 35 is cut off in the lock mechanism 24, the stepped pin 40 is pushed down by the force of the spring 37. When the lock pin 26 is not anchored to the notches 27H, 27L of the shift rod 25 at this time, the ball 38 moves outwardly in the radial direction along the slope of the recess 39 of the stepped pin 40. In this case, since the distance between the lower end surface 45 of the projection 42 of the sub-case 36 and the upper end surface 43 of the lock pin 26 is smaller than when the lock pin 26 is positioned at the notches 27H, 27L, the space 49 described above becomes narrower and the ball 38 is in the state where it cannot expand sufficiently outwardly in the radial direction. Accordingly, the stepped pin 40 is kept in the state where it stores the spring force of the spring 37. Therefore, if the switch of the alarm means 23 (see FIG. 2) is used conjointly and the alarm means such as buzzer is set to operate in this state, the driver knows the alarm and comes to notice that the vehicle cannot be parked or stopped in the parking range. Accordingly, the driver operates the transfer lever 28 and slides and moves the shift rod 25 so as to anchor the lock pin 26 with the notches 27H, 27L formed on the shift rod 25. When the lock pin 26 is anchored to the notches 27H, 27L, the shift rod 25 enters the lock state as described above so that the alarm stops and the driver comes to notice that the vehicle may be parked or stopped in the parking range P.

When the lock mechanism 24 in the operation device of the transmission in accordance with the present invention is constructed as described above, the lock pin 26 of the lock mechanism 24 can be anchored not only to the shift rod but also to various existing rod members by forming the notch on them. Accordingly, the lock mechanism 24 can be applied as other lock device, its fitting is extremely easy and the number of component parts may be small.

Figure 8:
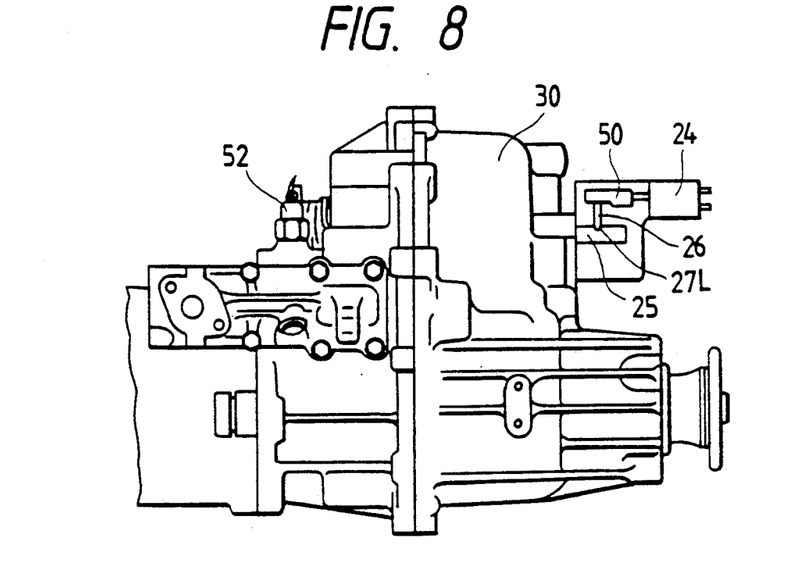
FIG. 8 is a schematic view showing another example of the fitting position of the lock mechanism.
Figure 9:
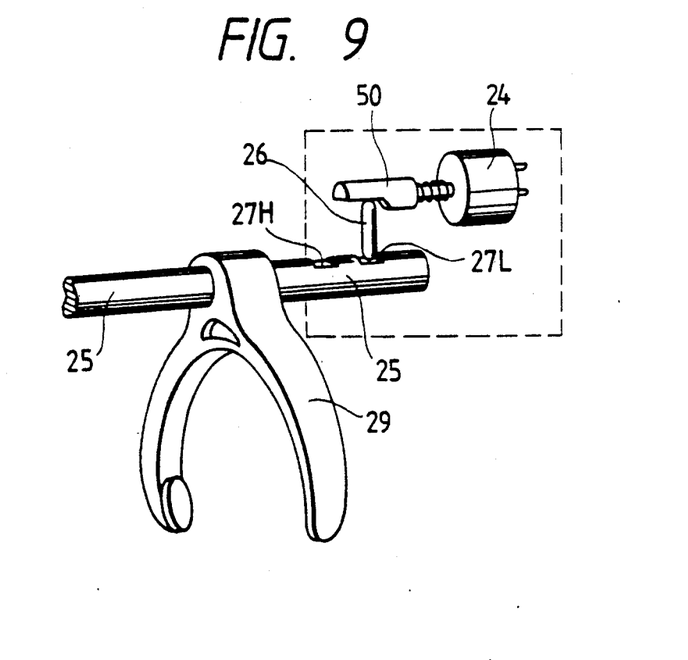
FIG. 9 is a perspective view showing the relationship between the lock mechanism assembled in the manual multi-range transfer shown in FIG. 1 and a shift rod.

Next, another fitting position of the lock mechanism 24 will be explained with reference to FIGS. 8 and 9. This lock mechanism 24 is the same when the lock mechanism 24 is disposed on the rod 25A fitted into the case 30 of the manual multi-range transfer as represented by reference numeral 24B explained with reference to FIG. 4. It is disposed outside and on the opposite side to the transfer case 30 and on the extension of the shift rod 25. The shift rod 25 is disposed on the manual multi-range transfer main body or inside the control box and the notches 27H, 27L are formed on this shift rod 25. In this operation device of the transmission, the sliding pin 50 is moved by the biasing force of the solenoid, the sliding motion of this sliding pin 50 moves up and down the lock pin 26 of the lock mechanism 24 and the lock pin 26 is anchored to the notches 27H, 27L so that the shift rod 25 can be locked. The shift lock mechanism having the structure shown in FIG. 10, 11 or 12, for example, can be applied as the lock mechanism 24 used hereby.

Figure 10:
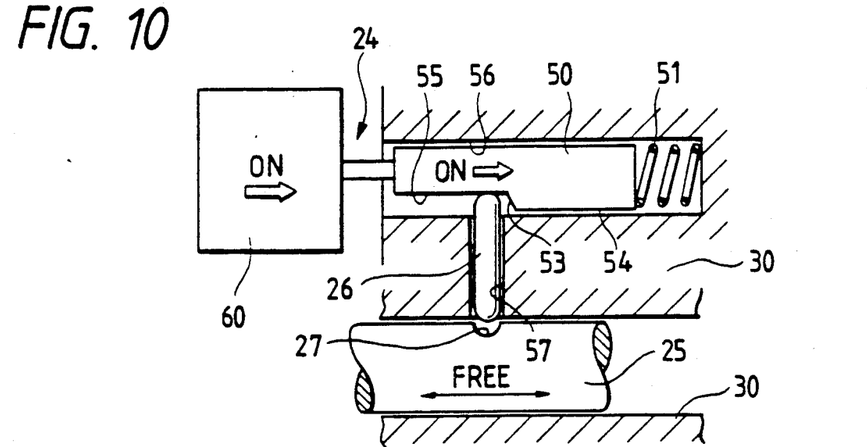
FIG. 10 is a schematic view showing another example of the lock mechanism under its free state.
Figure 11:
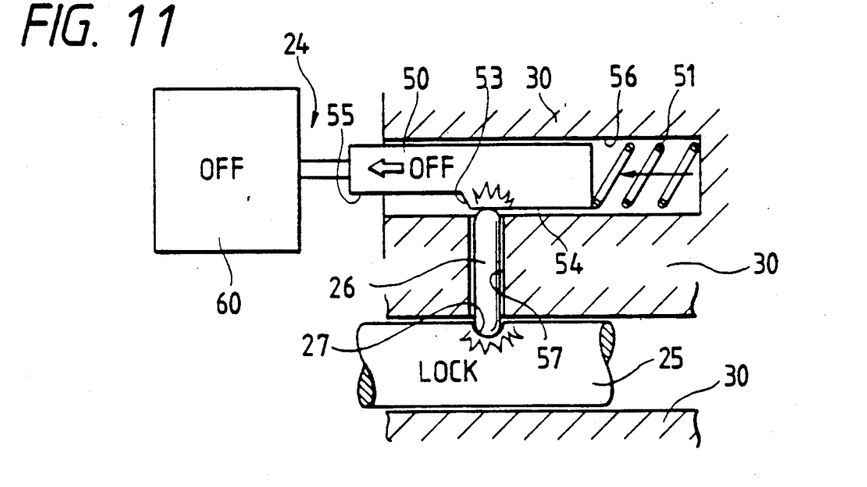
FIG. 11 is a schematic view showing the lock mechanism of FIG. 10 under its lock state.

Therefore, another example of the lock mechanism will be explained with reference to FIGS. 10 and 11. FIG. 10 is an explanatory view showing the non-lock state of the lock mechanism and FIG. 11 is an explanatory view showing its lock state. This lock mechanism 24 is of the type which is locked and unlocked in accordance with ON/OFF of the solenoid 60. Moreover, the lock mechanism 24 is consturcted in such a manner as not to bear the load acting on the lock pin 26 by the solenoid 60 but to bear it by the sliding pin 50 and by the case 30 of the transfer. The sliding hole 56 of the sliding pin 50 is formed on the case 30 and the spring 51 and the sliding pin 50 are disposed in this hole 56. This sliding pin 50 is slid and moved when the solenoid 60 is energized, and is equipped with a step portion 53 at its intermediate part. Therefore, when the solenoid 60 in the lock mechanism 24 is energized and when the sliding pin 50 projects from the solenoid 60 as shown in FIG. 10 and moves to the depth of the sliding hole 56 against the force of the spring 51 disposed in the sliding hole 56, the upper surface of the lock pin 26, which is disposed movably up and down in the through-hole 57 formed in the case 30, can strike the notch surface 55 of the sliding pin 50 and can move freely. According, the shift rod 25 can slide and move in the axial direction with respect to the case 30. In this manner the shift rod 25 can be shifted when the driver operates the transfer lever 28 (see FIG. 4). When the solenoid 60 is deenergized in the lock mechanism 24 and the sliding pin 50 retracts into the solenoid 60 by the force of the spring 51 inside the sliding hole 56 as shown in FIG. 11, the upper end surface of the lock pin 26 is pushed down by the step portion 53 of the sliding pin 50 and comes into contact with the projection surface 54 of the sliding pin 50 and is restricted between the sliding pin 50 and the shift rod 25. If this lock mechanism 24 is set by conjoint use of the switch of the alarm means 23 (set FIG. 2) so that the alarm means such as the buzzer operates at this point of time, the driver knows the alarm and comes to notice that the vehicle cannot be stopped or parked in the parking range P. Accordingly, the driver operates the transfer lever 28 (see FIG. 4) so as to slide and move the shift rod 25 and to anchor the lock pin 26 to the notch 27 formed on the shift rod 25. When the lock pin 26 is anchored to the notch 27, the shift rod 25 enters the lock state, the transmission is kept under the state where it is connected to the high speed range or to the low speed range and the driver can recognize that the vehicle may be parked or stopped in the parking range P.

Figure 12:
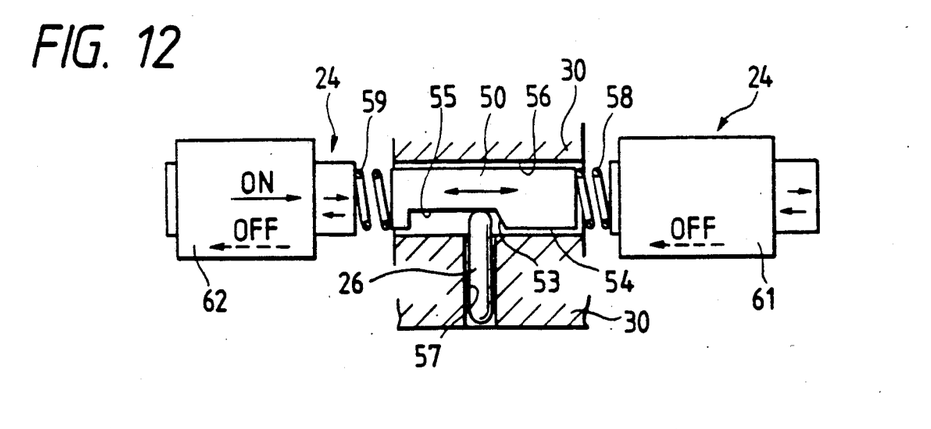
FIG. 12 is a schematic view showing still another example of the lock mechanism.

FIG. 12 shows still another example of the lock mechanism mechanism in the operation device of the transmission in accordance with the present invention. This lock mechanism 24 has exactly the same construction and the same function as the lock mechanism 24 explained with reference to FIG. 10 except that it has two solenoids 61 and 62. In this lock mechanism 24 the solenoid 61 is disposed on one of the ends of the sliding pin 50 and the solenoid 62, on the other end, and springs 58 and 59 are disposed for buffering between them. If the lock mechanism 24 is constructed as described above, the lock mechanism 24 can be turned ON by energizing the solenoid 62. When the solenoid 62 is turned ON, the lock pin 26 can come into contact with the notch surface 55, the lock pin 26 can move up and down freely and the shift rod 25 can slide and move. The solenoid 61 is energized, on the other hand, to turn OFF the lock mechanism 24. When the solenoid 61 is turned ON, the lock pin 26 can come into contact with the projecting surface 54 and its vertical motion is restricted, and the sliding motion of the shift rod 25 is locked by the lock pin 26.

What is claimed is:

1. An operation device of an automatic transmission comprising:
   an input shaft to which driving force of the automatic transmission is transmitted;
   an output shaft disposed on the same axis as said input shaft;
   a connecting device disposed between said input shaft and said output shaft, for connecting said input shaft and said output shaft;

a counter shaft having a first gear meshing with a gear of said input shaft and a second gear meshing with a gear of said output shaft;

first switching means for switching said input shaft either to a high speed range where it is directly coupled to said output shaft by said connecting device or to a low speed range where it is connected to said output shaft through said counter shaft by said connecting device;

the automatic transmission having a parking range, a reverse range, a neutral range, an automatic transmission range, a second range and a first range;

second switching means for shifting to either one of said ranges of said automatic transmission;

range detection means for detecting that said second detection means is positioned at said parking range;

lock means for locking said first switching means to either said high speed range or said low speed range in response to the detection by said range detection means that said second switching means is positioned at said parking range;

neutral position detection means for detecting that said first switching means is positioned at said neutral position between said high speed range and said low speed range; and alarm means for raising an alarm in response to the detection by said neutral position detection means that said first switching means is at said neutral position.

2. An operation device of an automatic transmission according to claim 1, wherein said first switching means is a transfer lever for effecting the switching operation to either said high speed range or said low speed range.

3. An operation device of an automatic transmission according to claim 1, wherein said second switching means is a control lever for effecting the switching operation to any one of said parking range, said reverse range, said neutral range, said automatic transmission range, said second range and said first range.

4. An operation device of an automatic transmission according to claim 1, wherein said connecting device is a synchronizing device.

5. An operation device of an automatic transmission comprising:

an input shaft to which driving force of the automatic transmission is transmitted;

an output shaft disposed on the same axis as said input shaft;

a connecting device disposed between said input shaft and said output shaft, for connecting said input shaft and said output shaft;

a counter shaft having a first gear meshing with a gear of said input shaft and a second gear meshing with a gear of said output shaft;

a front driving shaft and a rear driving shaft that are connected driveably to said output shaft;

a four-wheel driving system for transmitting the driving force to both of said front driving shaft and said rear driving shaft;

a two-wheel driving system for transmitting the driving force to either said front driving shaft or said rear driving shaft;

first switching means for switching said input shaft either to a high speed range where it is directly coupled to said output shaft by said connecting device or to a low speed range where it is connected to said output shaft through said counter shaft by said connecting device;

said first switching means capable of switching the driving system to either said four-wheel driving system or said two-wheel driving system when said output shaft is driveably connected to said high speed range;

the automatic transmission having a parking range, a reverse range, a neutral range, an automatic transmission range, a second range and a first range;

second switching means for shifting to any one of said ranges of said automatic transmission;

range detection means for detecting that said second switching means is positioned at said parking range;

lock means for locking said first switching means to either said high speed range or said low speed range in response to the detection by said range detection means that said second switching means is positioned at said parking range;

neutral position detection means for detecting that said first switching means is positioned at said neutral position between said high speed range and said low speed range;

driving system detection means for detecting to which of said four-wheel driving system and said two-wheel driving system said first switching means is operated; and alarm means for raising an alarm in response to the detection by said neutral position detection means that said first switching means is at said neutral position.

6. An operation device of an automatic transmission according to claim 5, wherein said connecting device is a synchronizing device.

7. An operation device of an automatic transmission according to claim 5, wherein said first switching means is a transfer lever for effecting the switching operation to either said high speed range or said low speed range and to either said four-wheel driving system or said two-wheel driving system.

8. An operation device of an automatic transmission according to claim 5, wherein said alarm means raises an alarm in response to the connection state detection signal of said four-wheel driving system by said driving system detection means.

9. An operation device of an automatic transmission comprising:

an input shaft to which driving force of an engine is transmitted;

an output shaft disposed on the same axis as said input shaft;

a counter shaft having a first gear mashing with a gear of said input shaft and a second gear meshing with a gear of said output shaft;

a connecting device disposed between said input shaft and said output shaft, for connecting said input shaft and said output shaft, said connecting device having a sleeve which is slideable to drivingly connect the input shaft with either the output shaft or the counter shaft;

first switching means for switching said input shaft either to a high speed range where it is directly coupled to said output shaft by said connecting device or to a low speed range where it is connected to said output shaft through said counter shaft by said connecting device;

a shift rod moved in an axial direction by the operation of said first switching means and having said sleeve fixed thereto said shift rod driveably connecting said sleeve to either said gear disposed on said input shaft or said gear disposed on said output shaft when it moves in the axial direction;

an automatic transmission having a parking range, a reverse range, a neutral range, an automatic transmission range, a second range and a first range;

second switching means for shifting to either one of said ranges of said automatic transmission;

range detection means for detecting that said second detection means is positioned at said parking range;

lock means for locking said first switching means to either said high speed range or said low speed range in response to the detection by said range detection means that said second switching means is positioned at said parking range;

neutral position detection means for detecting that said first switching means is positioned at said neutral position between said high speed range and said low speed range; and alarm means for raising an alarm in response to the detection by said neutral position detection means that said first switching means is at said neutral position.

10. An operation device of a transmission according to claim 9, wherein said connecting device is a synchronizing device.

11. An operation device of an automatic transmission according to claim 9, wherein said first switching means is a transfer lever for effecting the switching operation to either said high speed range or to said low speed range.

12. An operation device of an automatic transmission according to claim 9, wherein said second switching means is a control lever for effecting the switching operation to any one of said parking range said reverse, said neutral range, said automatic transmission range, said second range and said first range in said automatic transmission.

13. An operation device of an automatic transmission according to claim 9, wherein said lock means consists of a lock pin for engaging with a notch formed on said shift rod, and a spring for anchoring said lock pin with said notch and a solenoid operating to release the engagement of said lock pin.

14. An operation device of an automatic transmission according to claim 9, wherein said lock means consists of a lock pin engaging with a notch formed on said shift rod, and a solenoid operating to engage said lock pin to said notch and a solenoid operating to release the engagement of said lock pin, and the load of said lock pin.

* * * * *